No. 794,736. PATENTED JULY 18, 1905.
I. PEABODY.
CONVEYER.
APPLICATION FILED APR. 18, 1904.

Witnesses:
J. Hogan
W. Ekenstein

Inventor:
Isaac Peabody
by William B. Roberts
Atty.

No. 794,736.                                   Patented July 18, 1905.

UNITED STATES PATENT OFFICE.

ISAAC PEABODY, OF ST. MARYS, CANADA.

CONVEYER.

SPECIFICATION forming part of Letters Patent No. 794,736, dated July 18, 1905.

Application filed April 18, 1904. Serial No. 203,800.

*To all whom it may concern:*

Be it known that I, ISAAC PEABODY, a subject of the King of Great Britain, residing at St. Marys, in the county of York, Province of New Brunswick, Canada, have invented new and useful Improvements in Conveyers, of which the following is a specification.

This invention relates to conveyers, and has for its object to provide a conveyer which is especially adapted to handle agricultural products, such as potatoes and roots, &c., to the end that they may be quickly and easily loaded and unloaded or stored in any desired place.

To carry out these objects, the invention consists in a conveyer constructed substantially as hereinafter illustrated and described, and defined in the appended claim.

Figure 1:
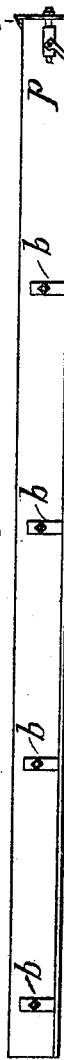
Figure 2:
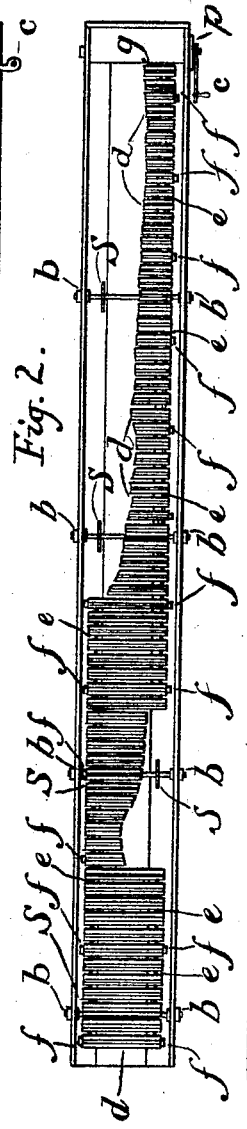
Figure 3:
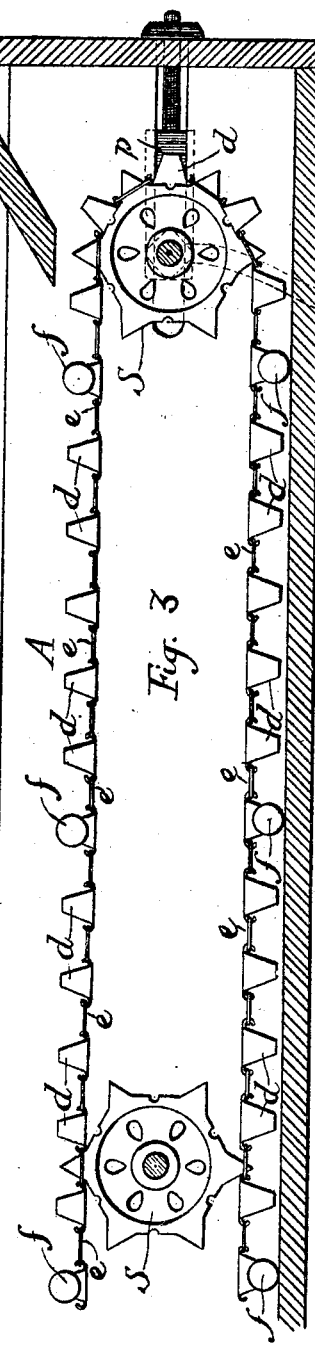
Figure 4:
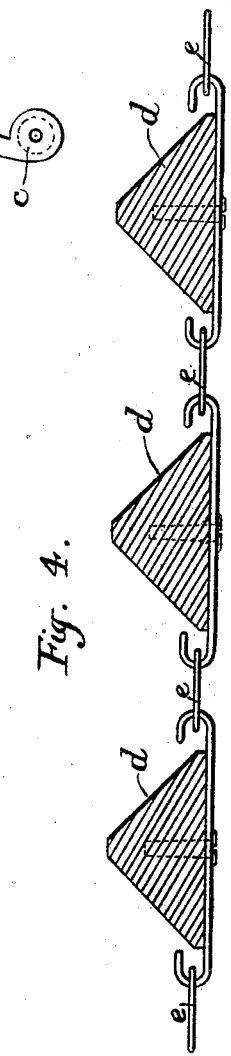

Referring to the drawings, in which similar letters of reference indicate similar parts, Figure 1 is a side elevation of the entire machine. Fig. 2 is a plan or top view, parts being broken. Fig. 3 is a central longitudinal section enlarged. Fig. 4 is a detail view of a portion of the carrier.

In the drawings, A is the frame of the conveyer and is preferably of wood and is constructed open at the top, the end, and at the bottom, excepting a narrow board secured on each side, on which the carrier or belt is supported. The frame is braced and strengthened by iron rods $b\ b$, which extend down the sides of the frame and across the bottom and are secured in any suitable manner to the said frame. A sprocket-wheel $s$ is attached to each of these rods within the frame and near the side thereof. The wheel at each end of the frame is keyed to the rod, while the intermediate wheels are loosely sleeved on the rods, so as to revolve thereon. An endless chain $e\ e$ extends from and around the end sprocket-wheels and is supported upon the intermediate wheels. Suitably spaced upon the sprocket-chain are secured slats, preferably triangular in form with the apex flattened. A crank and handle $c$, attached to the sprocket-wheel near one end of the frame, gives the necessary motion to the conveyer-belt. The shaft of either or both of the end sprocket-wheels may be journaled in a suitable tension-regulating device $p$. At suitable points on the conveyer-belt may be secured friction-rollers $f\ f$, which are adapted to travel along the bottom strip of the frame.

If desired, one end of the frame may be constructed somewhat higher than the other and provided with an inclined board, thus closing that end. A suitable bail may be secured to either end of the frame to aid in supporting the conveyer in its operative position.

When unloading from a wagon, the closed end is placed on or close to the tail of the wagon, the open end being let through a cellar window or door, or when desired the potatoes or other roots are shoveled or dumped on the platform and the operator turns the crank, thus causing the belt to travel, carrying with it the roots to the desired place, while the dirt falls through between the slats and through the open bottom to the ground.

What I claim as my invention, and desire to secure by Letters Patent, is—

The herein-described conveyer comprising a frame open at the top and bottom and having tracks at the bottom of said frame, a series of horizontal brace-rods across the frame, sprocket-wheels on each of said rods, a driving-shaft mounted in adjustable bearings at one end of the frame, driving-sprockets on said shaft, and an endless carrier composed of a plurality of sprocket-chains adapted to coöperate with said sprockets, and spaced cross-slats attached to the chains, a portion of said slats being provided with antifriction-rollers which travel upon said tracks, substantially as described.

In testimony whereof I have signed my name to this specification in the presence of two subscribing witnesses.

ISAAC PEABODY.

Witnesses:
 DANIEL ELLIOTT,
 J. H. BARRY.